Figure 1:
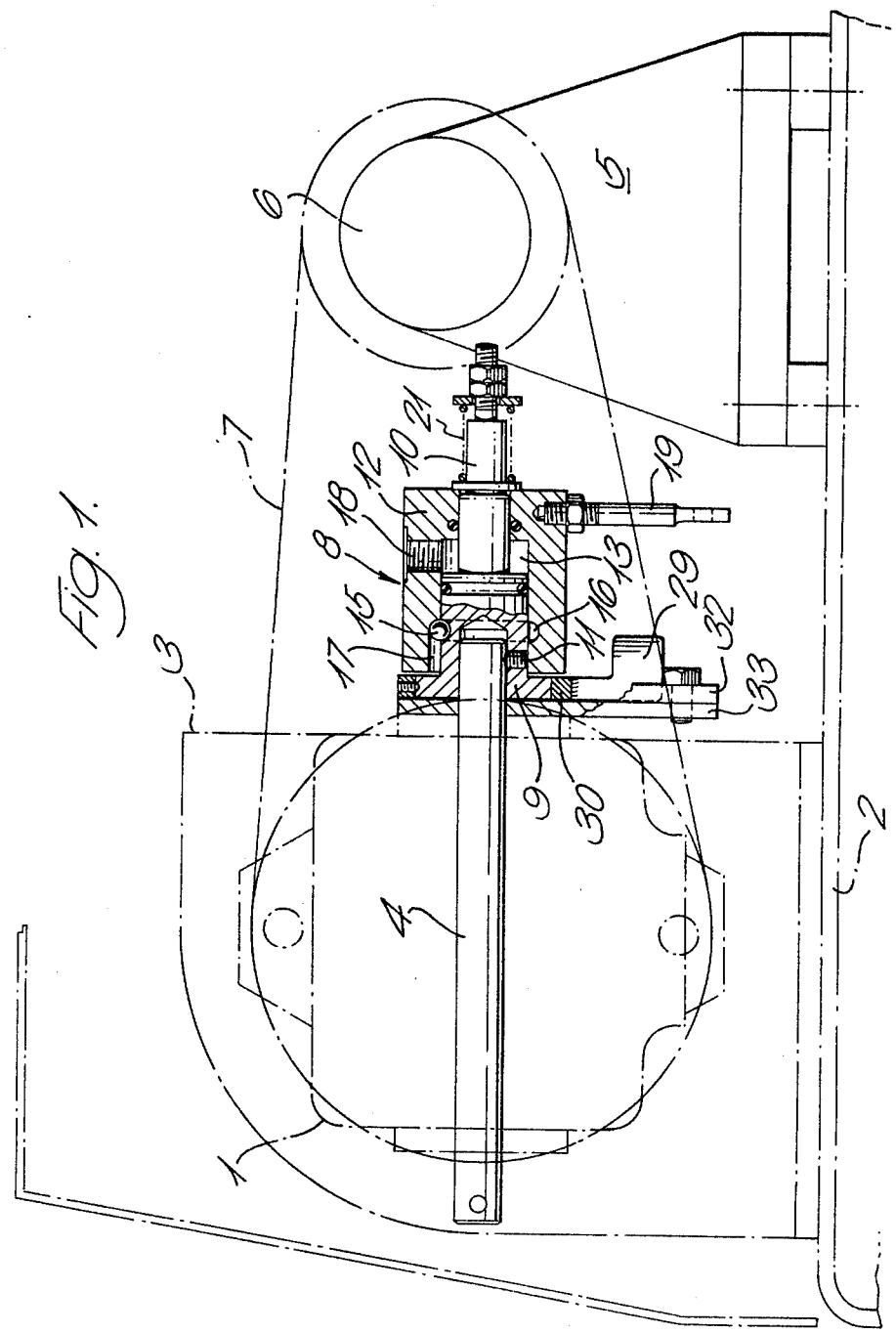

United States Patent [19]

Heathcote et al.

[11] 4,240,333
[45] Dec. 23, 1980

[54] HYDROSTATICALLY DRIVEN ROAD ROLLERS

[75] Inventors: Terence R. Heathcote, Holcombe, near Bath; Ralph G. Jefferies, Bitton, near Bristol, both of England

[73] Assignee: Stothert & Pitt Limited, Somerset, England

[21] Appl. No.: 62,336

[22] Filed: Jul. 31, 1979

[30] Foreign Application Priority Data

Sep. 25, 1978 [GB] United Kingdom ............... 37998/78

[51] Int. Cl.³ ............................. F01B 3/02; F04B 1/26
[52] U.S. Cl. ...................................... 92/12.2; 60/403; 60/487; 91/505; 417/213
[58] Field of Search .................. 417/222, 213; 91/506, 91/505; 92/7, 12.1, 13, 122; 60/403, 476, 487; 192/85 AT, 71, 38

[56] References Cited

U.S. PATENT DOCUMENTS

| 901,408 | 10/1908 | Wirtz | 192/71 |
|---|---|---|---|
| 1,390,262 | 9/1921 | Anderson | 192/71 |
| 2,932,948 | 4/1960 | Neff et al. | 417/222 X |

Primary Examiner—Irwin C. Cohen

[57] ABSTRACT

A hydrostatically driven road roller having a swash plate pump controlling the supply of pressurized fluid to a drive motor, a dead man's handle or the like controlling pressurization of the fluid in the fluid system, a manual speed control lever connected to the swash plate pump, and a disconnectible device positioned in the connection between the control lever and the pump. The disconnectible device comprises a piston fixed to a swash plate control shaft, a cylinder movable on and lockable with the piston, and means for moving the cylinder into and out of locking engagement with the piston. Centralizing means are also provided to move automatically the swash plate into a neutral position.

8 Claims, 4 Drawing Figures

HYDROSTATICALLY DRIVEN ROAD ROLLERS

This invention relates to hydrostatically driven road rollers both of the vibratory and non-vibratory types. The invention is especially applicable to pedestrian controlled single-roll roller machines.

More particularly, the invention is concerned with a machine in which the hydrostatic drive includes a variable displacement swash plate pump which is controllable by the operator to vary the amount of fluid passed to a drive motor and thereby controls the travelling speed, and the direction of travel, of the machine, and also a dead man's handle, or other corresponding means, which must be held, by the operator, in an operative position in order to operate the machine, and which moves automatically into an inoperative position when released.

It is among the objects of the present invention to provide a roller machine having means prevent manual control of the swash plate pump when the dead man's handle, or other corresponding means, is in an inoperative position.

It is further among the objects of the present invention to provide means which cause the swash plate of the pump to return automatically to a neutral position when the dead man's handle, or other corresponding means, is moved into its inoperative position.

According to the present invention, there is provided a hydrostatically driven road roller which includes a variable displacement swash plate pump having a swash plate control shaft connected to a manual control lever, and a dead man's handle which controls pressurization of the fluid in the fluid system, wherein the connection between the swash plate control shaft and the manual control lever includes a disconnectible device which is adapted automatically to cause the manual control lever to become ineffective when the dead man's handle is in an inoperative position.

Preferably, the disconnectible device comprises a piston and piston rod fixedly secured to the swash plate control shaft, a cylinder having a bore and positioned over the piston and piston rod for lengthwise axial, and angular turning, movement relative thereto, means for interconnecting the cylinder with the piston, spring means for biasing the cylinder into a disconnected position, and a fluid port in the cylinder wall providing communication between the cylinder bore and the fluid system, whereby in use, when the dead man's handle is in its operative position, the pressurized fluid moves the cylinder, against the action of said spring means, into a connected position.

According to the invention furthermore, centralizing means are provided to move the swash plate into a neutral position when the cylinder is moved into its disconnected position.

Figure 2:
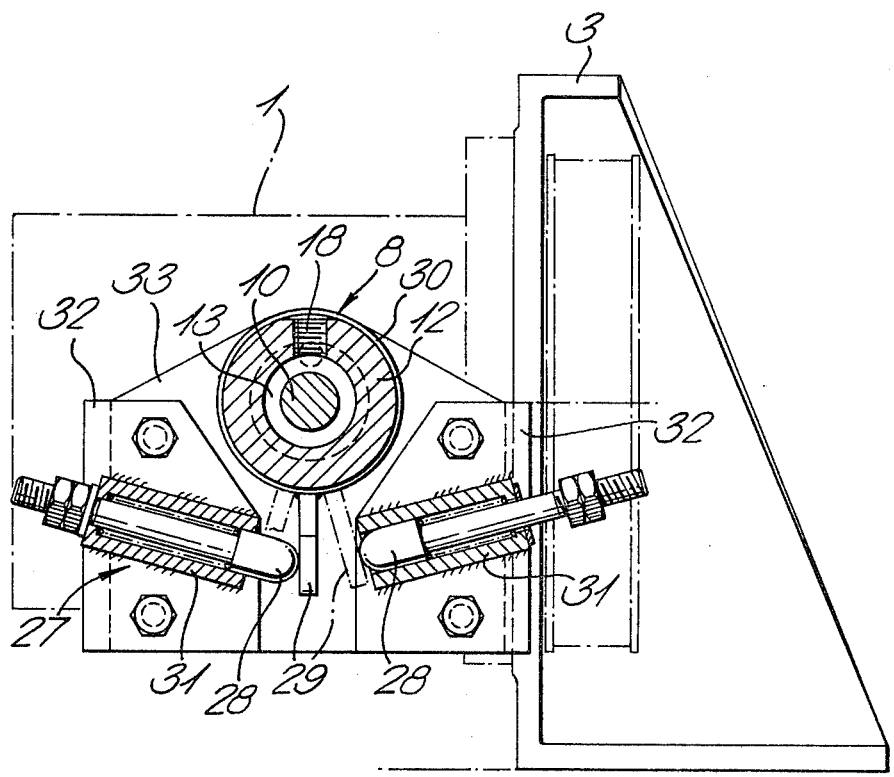
Figure 3:
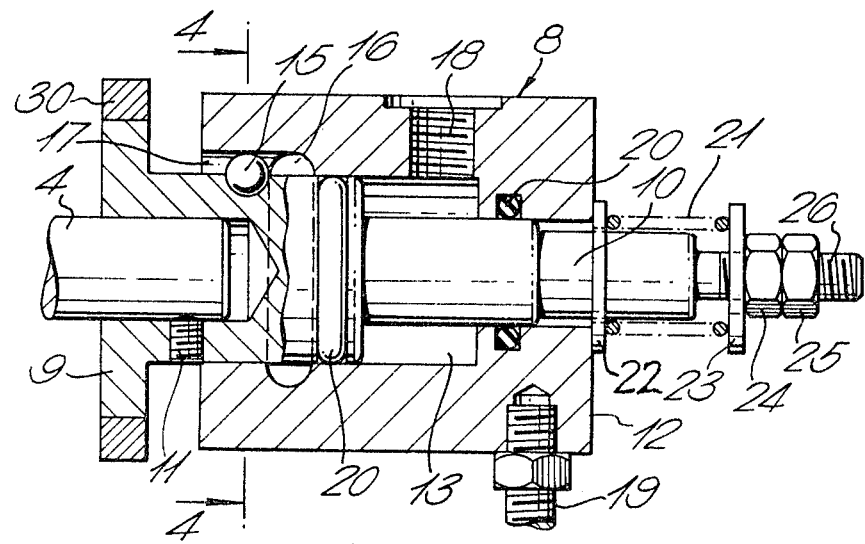
Figure 4:
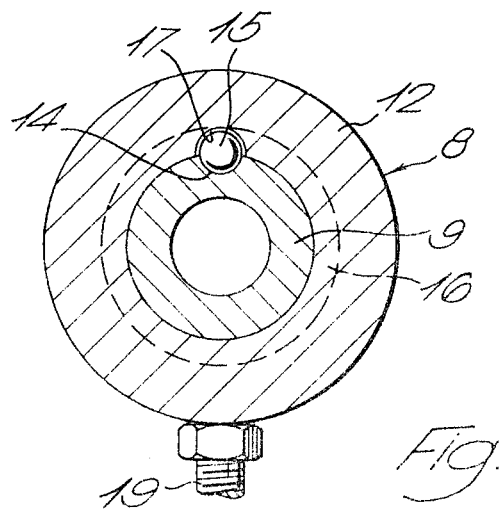

The invention is illustrated by way of example in the accompanying drawings in which, FIG. 1 is a view, partly in section, showing the disconnectible device in position relative to the swash plate pump and drive motor, FIG. 2 is a transverse view, partly in section, showing the disconnectible device and the swash plate biasing means, FIG. 3 is a longitudinal section, on an enlarged scale, of the disconnectible device, and FIG. 4 is a section on the line 4—4 of FIG. 3.

Referring to the drawings, there is shown a variable displacement swash plate pump 1 supported on a roller frame part 2 via a bracket 3, the pump 1 having a swash plate control shaft 4 which is turnable about its longitudinal axis to adjust the position of a pump swash plate (not shown) which is mounted thereon.

Also mounted on the roller frame part 2 is a drive motor 6 which drives the pump 1 at a fixed speed, via a drive belt 7.

A pump and a hydraulic motor (not shown) are provided in a hydraulic circuit of the roller machine, the hydraulic circuit also including a dead man's handle or other corresponding means (not shown) which control pressurization of the fluid in the circuit. Thus, in order to operate the machine, the dead man's handle must be held, by the machine operator, in an operative position in order to pressurize the hydraulic circuit and enable operation of the machine to take place. Immediately the operator releases the dead man's handle, it moves automatically into an inoperative position thereby releasing pressure in the hydraulic circuit thus stopping operation of the machine.

Thus, although the dead man's handle serves adequately to put the machine out of operation when the operator loses control thereof by releasing the dead man's lever, it does not re-position other control means of the machine. For example, if the swash plate of the pump 1, which is manually adjusted by the operator from a control lever connected to the swash plate control shaft 4, is left in a full-speed-forward position when the dead man's handle is released then, on re-operating the machine, because of the vicious torque reaction it will surge forward. This is not only dangerous but also has the disadvantage that it causes roll slip with consequential damage to the surface being rolled.

To avoid the aforementioned problem, a disconnectible device 8 is arranged in the connection between the swash plate control shaft 4 and the manual control lever (not shown).

The device 8 comprises a flanged piston 9 having an integral piston rod 10, the piston being fixed, as by a grub screw 11, to one end of the swash plate control shaft 4. The device further includes a cylinder 12 having a bore 13 which is positioned over the piston and piston rod for angular turning movement, and lengthwise movement, relative thereto.

The periphery of the piston 9 is formed, at a position corresponding to the neutral position of the swash plate, with a semi-sperical recess 14 in which is received and retained a ball 15. Furthermore, the inner peripheral surface of the cylinder 12 is formed with an annular groove 16 of semi-circular cross-section, and also with an axially disposed groove 17 of semi-circular cross-section, both of which co-act with the ball 15.

The cylinder 12 also includes a fluid port 18 which provides communication between the cylinder bore 13 and the hydraulic circuit, and a lever 19 which is coupled to the manual control lever which serves, when operative, to angularly turn the cylinder 12, and thus also the control shaft 4, between forward, neutral and reverse positions to control the speed, and the direction of operation, of the drive motor 6.

Suitable O-rings 20 are provided to seal off the cylinder bore 13.

A compression spring 21 is mounted on the free end of the piston rod 10 to bias the cylinder 12 into an inoperative position as hereinafter described. As can be seen, particularly in FIG. 3, the spring 21 is positioned between a washer 22 bearing against the end of the cylinder 12, and a washer 23 bearing against a retaining nut 24 and lockout 25 provided on a screwthreaded portion 26 of the piston rod 10.

In use, the inoperative position shown in FIG. 1, the ball 15 is in alignment with the annular groove 16 so that the piston and cylinder of the device 8 are not interconnected. Thus, angular turning movement of the cylinder 12 will not turn the control shaft 4.

In order to make the machine operative, the manual control lever has to be put in its neutral position where the axial groove 17 is in alignment with the ball 15. The operator then moves the dead man's handle into its operative position to pressurize the hydraulic circuit. This pressure moves the cylinder 12, against the action of the spring 21, into an operative position (see FIG. 3) where the groove 17 engages the ball 15 and interconnects the cylinder 12 with the piston 9. Thus, the cylinder 12 and piston 9 are locked together so that the manual control lever will be operative to angularly turn the swash plate and thereby control the speed, and direction of movement, of the drive motor 6.

If, at any time, the dead man's handle is released by the operator, pressure in the cylinder bore 13 will be released by the dead man's handle which releases pressure through fluid port 18, and the cylinder 12 will be moved, under the action of the spring 21, into its inoperative position as shown in FIG. 1 where the ball 15 is in alignment with the annular groove 16.

Thus, it will be seen that the disconnectible device 8 provides automatic means for making the manual control lever ineffective unless the dead man's lever is in its operative position.

In order to ensure that the control shaft 4, and thus the swash plate, are returned to a neutral position when the dead man's handle is moved into its inoperative position, centralizing means 27 are provided in operative association with the piston 9.

The centralizing means 27 comprise a spring-loaded plunger 28 arranged on each side of a lever 29 attached, via a ring 30, to the flange of the piston 9.

Each plunger 28 is supported in a cylinder 31 fixed to a bracket 32 which is attached to a mounting plate 33 provided on the pump 1. In FIG. 2, the full line position of the lever 29 is in the neutral position and the chain dot lines show the maximum speed forward and maximum speed reverse positions. Furthermore, one of the plungers 28 is shown in the neutral position of the lever 29 and the other is shown in the maximum speed forward position.

Thus, it will be seen that, when the dead man's handle is released and the ball 15 is brought into alignment with the groove 16, the control shaft 4 will be turned, under the action of the plungers 28, into the neutral position of the pump 1. This will occur irrespective of the radial position of the cylinder 12 and thus also of the manual control lever. The effect of this is that, although the manual control lever is still in drive position, the pump 1 is not imparting pressure to the drive motor 6. Furthermore, if for example, the manual control lever is in its maximum speed forward position, because the ball 15 is not in alignment with the axial groove 17, even if the dead man's handle is moved into its operative position, the swash plate will remain in its neutral position and no drive will be imparted to the machine. Therefore, in order to impart drive to the machine, it is necessary first to move the manual control lever into its neutral position. This will effect interlocking of the piston 9 and the cylinder 12 so that the pump 1 can be controlled in the normal way by the manual control lever.

It will be appreciated that the provision of the disconnectible means causes the manual control lever to be inoperative unless the dead man's lever is in its operative position and, in combination with the centralizing means, causes the swash plate pump 1 to return automatically to a neutral position and thereby prevents use of the manual control lever unless it is first moved into its neutral position.

We claim:

1. A hydrostatically driven road roller which includes a variable displacement swash plate pump having a swash plate control shaft connected to a manual control lever, and a dead man's handle which controls pressurization of the fluid in the fluid system, wherein said connection between said swash plate control shaft and said manual control lever includes a disconnectible device which is adapted automatically to cause said manual control lever to become ineffective when said dead man's handle is in an inoperative position.

2. A road roller as claimed in claim 1, wherein said disconnectible device comprises a piston and piston rod fixedly secured to said swash plate control shaft, a cylinder having a bore and positioned over said piston and piston rod for lengthwise axial, and angular turning, movement relative to said piston and said piston rod, means for interconnecting said cylinder with said piston, spring means for biasing said cylinder into a disconnected position, and a fluid port in said cylinder wall providing communication between said cylinder bore and said fluid system, whereby in use, when said dead man's handle is in its operative position, the pressurized fluid moves said cylinder, against the action of said spring means, into a connected position.

3. A road roller as claimed in claim 2, wherein said means for interconnecting said cylinder with said piston comprise a ball retained in a recess formed in said piston which co-acts with an axially extending groove formed in the inner periphery of said cylinder.

4. A road roller as claimed in claim 3, including an annular groove formed in the periphery of said cylinder said groove co-acting with said ball when said cylinder is in its disconnected position.

5. A road roller as claimed in claim 2, wherein said spring means comprise a compression spring mounted on the free end of said piston rod between said cylinder and adjustable stop means.

6. A road roller as claimed in claim 2, including centralizing means for biasing said swash plate into a neutral position.

7. A road roller as claimed in claim 6, in which said centralizing means comprises a pair of oppositely acting spring-loaded plungers which are operatively associated with said piston.

8. A road roller as claimed in claim 7, including a lever which is attached to said piston and is positioned between said co-acting plungers.

* * * * *